M. A. REBERT.
PROCESS OF PRODUCING METALLIC ALLOYS.
APPLICATION FILED APR. 8, 1914. RENEWED MAY 23, 1916.
1,215,857.
Patented Feb. 13, 1917.
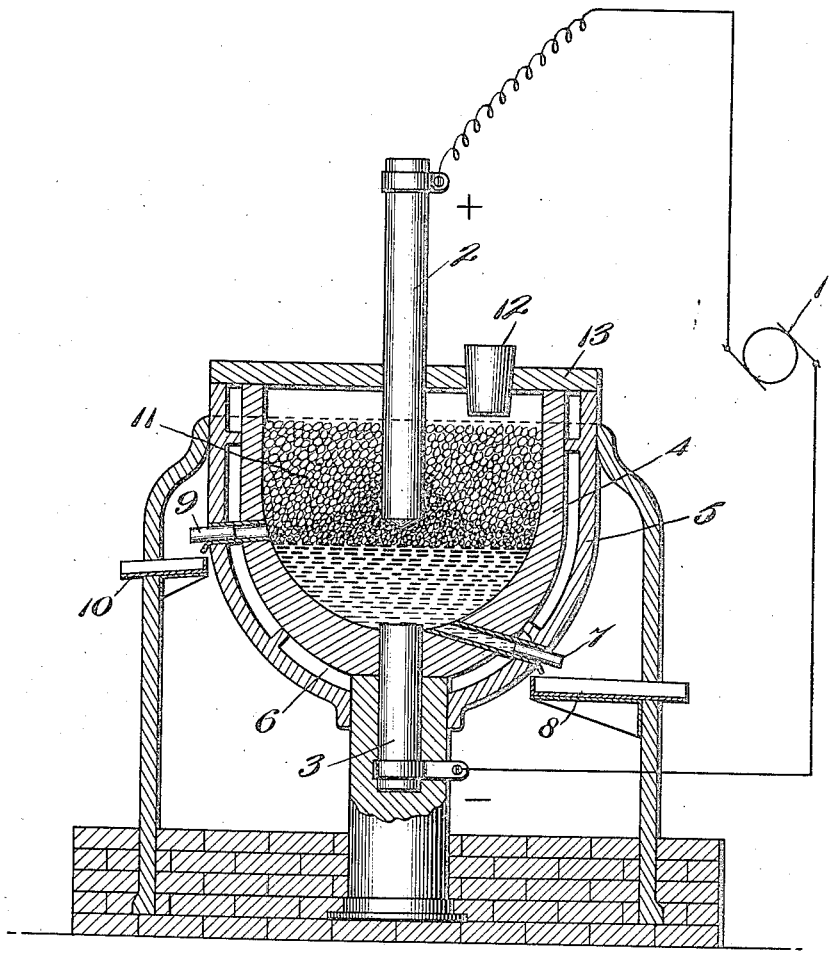

UNITED STATES PATENT OFFICE.

MICHAEL A. REBERT, OF YORK, PENNSYLVANIA.

PROCESS OF PRODUCING METALLIC ALLOYS.

1,215,857. Specification of Letters Patent. Patented Feb. 13, 1917.

Application filed April 8, 1914, Serial No. 830,526. Renewed May 23, 1916. Serial No. 99,439.

*To all whom it may concern:*

Be it known that I, MICHAEL A. REBERT, a citizen of the United States, and residing at York, in the county of York and State of Pennsylvania, have invented certain new and useful Improvements in Processes of Producing Metallic Alloys; and I do hereby declare the following to be a full, clear, and exact description of the invention, such as will enable others skilled in the art to which it appertains to make and use the same.

This invention relates to the process of obtaining nickel and other metals from various ores and compounds of said metals with silicon, and especially from nickeliferous ores containing silicon in the form of silicates such as garnierite, a hydrous nickel magnesium silicate usually expressed by the formula $H_2MgNiSiO_4$, and it has for its object to produce a method of such a character that it will be more efficient and less costly than the procedures now in common use.

To these ends the invention consists in the novel steps constituting my process and involving a molten bath or electrolyte more fully hereinafter disclosed and particularly pointed out in the claims.

In carrying out my process, I take advantage of the well known affinity of fluorin for metals, especially silicon to separate the nickel from the silicon with which it is combined, and in order to readily produce the free fluorin and cause the same to act efficiently on the nickeliferous compound, I liberate the said fluorin in a molten electrolyte formed in an electric furnace, all as will now be disclosed.

Referring to the accompanying drawings forming a part of this specification, the figure illustrates a diagrammatic view of a furnace suitable for carrying out my process.

1 indicates any suitable source of current, 2 the anode which may be made of graphite, and 3 any suitable cathode which is also conveniently made of graphite, 4 is the furnace body made of any suitable well known material, and 5 is the outer shell of said body preferably made of metal, and providing a heat insulating space 6 between the same and the portion 4. 7 is an outlet for the nickel or other metal obtained by my process, 8 is a trough or other receptacle for receiving the same, 9 is an outlet for the slag and 10 is a suitable conveyer for the same. The charge material 11 may be introduced into the furnace through any suitable means, as for example the chute 12, and the furnace is preferably provided with a suitable cover 13 through which said chute passes.

The charge material 11 is preferably made up as follows:—

Calcium fluorid $CaF_2$ is first put into the furnace and brought to a molten condition by placing the electrode 2 sufficiently close to the electrode 3 to strike an arc, or to otherwise melt the said calcium fluorid and then the nickeliferous garnierite, such as $H_2MgNiSiO_4$, or other ore to be operated upon, is gradually added through the chute 12, when it likewise is melted and mixed with the molten calcium fluorid.

The continued passage of the current liberates the fluorin from the calcium fluorid and thereby brings about a reaction between the silicon of the ore and said fluorin, whereupon the nickel is liberated. The fluorin being liberated in the presence of molten and other hot ore readily attacks the silicon of said ore and thereby exerts a strong reducing action. This action is facilitated by the fact that the fluorin liberated at the anode is carried by the boiling action of the molten bath into and through the same and therefore it readily permeates the mass immediately surrounding said anode.

If the ore is carefully fed into the furnace and the calcium fluorid is also constantly renewed a substantially pure metal, nickel pig in this instance, or an alloy can be readily withdrawn from the spout 7.

In order to make a ferro-nickel by this process it is only necessary to add iron, iron ore or a nickel ore high in iron, to the bath of substantially pure metal, when in the case of the addition of iron alone, the liberated nickel will readily alloy with the same; or in the case of the addition of iron ore to the nickel compound the said ore will be readily reduced and the nickel will alloy with the reduced iron, while in the case of employing a nickel ore high in iron, there is usually sufficient iron to produce a ferro-nickel alloy direct from the ore.

The calcium and other impurities in the ore, of course, will form a slag which will float upon the molten bath (of metal) and may be drawn off through the spout 9.

Instead of calcium fluorid, of course, I may use other fluorids such as sodium fluorid NaF and potassium fluorid KF which would produce a more fluid flux, but I prefer calcium fluorid on account of its cheapness.

It will be observed that my process in fact, owing to the strong affinity of fluorin for silicon, results in the removal of the silicon from the metal instead of the metal from the silicon. And it will further be observed that owing to the permeation of the mass by the fluorin liberated at the electrodes there is a constant removal of the silicon to form a slag which floats on top of the molten bath (of metal) while there is likewise a constant flow of the heavy material down into the region where the reactions are going on.

An alternating current also gives good results, owing possibly to the fact that the decomposing ore supplies rapidly changing secondary electrodes in the bath, on which the ions may be deposited and which change so rapidly that said ions are not re-composed when this current is reversed. Whatever the true explanation may be, I have actually produced both the metallic nickel and ferro-nickel by the above process with the alternating current.

What I claim is:—

1. The steps in the process of producing metallic alloys which consist in subjecting a compound containing fluorin to a temperature sufficient to melt said compound, and to the action of an electric current to free its fluorin; in adding a compound containing the metal to be alloyed to said molten compound and thereby causing said fluorin to free said metal from its combination; and in permitting the metal thus freed to form a bath suitable for alloying said metal with another metal, substantially as described.

2. The process of producing a metallic alloy which consists in subjecting a compound containing fluorin to a temperature sufficient to melt said compound, and to the action of an electric current to free the fluorin; in adding a compound containing one of the constituents of said alloy to said molten compound and thereby causing said fluorin to free said constituent from its combination; and in causing said constituent to enter into the desired alloy, substantially as described.

3. The process of producing an alloy of nickel and iron which consists in subjecting a fluorid to a temperature sufficient to melt the same and to the action of an electric current to free the fluorin; in adding a compound of nickel to said fluorid and thereby causing the freed fluorin to act upon said nickel compound to free the nickel; and in causing the nickel thus obtained to come in contact with molten iron, substantially as described.

4. The process of producing a ferro-nickel alloy which consists in subjecting fluorid of calcium and nickeliferous ore containing iron to a temperature sufficient to melt the fluorid and to the action of an electric current to free the fluorin thereby causing the iron and nickel to be reduced and later to become alloyed, substantially as described.

In testimony whereof I affix my signature.

MICHAEL A. REBERT.